(12) United States Patent
Mariana (10) Patent No.: US 7,047,558 B1
(45) Date of Patent: May 16, 2006

(54) SECURE TERMINAL PROVIDED WITH A SMART CARD READER DESIGNED TO COMMUNICATE WITH A SERVER VIA AN INTERNET NETWORK

(75) Inventor: Renaud Mariana, Le Chesnay (FR)

(73) Assignee: CP8 Technologies, Paris (FR)

( * ) Notice: Subject to any disclaimer, the term of this patent is extended or adjusted under 35 U.S.C. 154(b) by 646 days.

(21) Appl. No.: 09/869,434

(22) PCT Filed: Oct. 26, 2000

(86) PCT No.: PCT/FR00/02979

§ 371 (c)(1),
(2), (4) Date: Jun. 28, 2001

(87) PCT Pub. No.: WO01/31880

PCT Pub. Date: May 3, 2001

(30) Foreign Application Priority Data

Oct. 28, 1999 (FR) .................................. 99 13508

(51) Int. Cl.
*G06F 7/04* (2006.01)

(52) U.S. Cl. ............................................. 726/3; 725/6

(58) Field of Classification Search ................ 726/2–7, 726/14, 18–19, 34; 725/6; 709/101–102, 709/223, 225, 229–230; 380/229
See application file for complete search history.

(56) References Cited

U.S. PATENT DOCUMENTS 5,910,987 A * 6/1999 Ginter et al. .................. 705/52
5,987,538 A * 11/1999 Tavallaei et al. ............... 710/48
5,991,569 A * 11/1999 Sugihara et al. ............. 399/113
6,375,625 B1 * 4/2002 French et al. ................ 600/573
6,563,821 B1 * 5/2003 Hong et al. .................. 370/389
6,792,536 B1 * 9/2004 Teppler ....................... 713/178
6,816,965 B1 * 11/2004 Moore et al. ................ 713/158
6,892,309 B1 * 5/2005 Richmond et al. .......... 713/201

FOREIGN PATENT DOCUMENTS

WO    WO 97 50207 A    12/1997
WO    WO 98 57474 A    12/1998

* cited by examiner

*Primary Examiner*—Kim Vu
*Assistant Examiner*—Leynna T. Ha
(74) *Attorney, Agent, or Firm*—Miles & Stockbridge P.C.; Edward J. Kondracki (57) ABSTRACT

The invention concerns an architecture of a terminal (5) allowing communications between a smart card (8) and a web server (4), via an internet network (RI). The terminal (5) is equipped with a secure enclosure (6) comprising a smart card reader (8), a keyboard (62), and optionally, other computing resources (63). The non-secure part of the terminal (5) comprises a web browser (51) and a first communication node (50) that routes the requests received to the browser (51) or to the secure enclosure (6). The secure enclosure (6) comprises a second communication node (60) and an HTTP server (61). The smart card (8) comprises a third communication node (80) and an HTTP server (81). The web server (4) comprises a merchant application (41) that can be placed in communication with the smart card (8) and activate software applications ($A_1$–$A_n$) of the latter.

8 Claims, 4 Drawing Sheets

SECURE TERMINAL PROVIDED WITH A SMART CARD READER DESIGNED TO COMMUNICATE WITH A SERVER VIA AN INTERNET NETWORK

FIELD OF THE INVENTION

The invention relates to an architecture of a terminal, more specifically a terminal of the type using a keyboard and a smart card reader located in a secure enclosure, and designed to communicate with a server via an internet network.

BACKGROUND OF THE INVENTION

A device of this type is known, for example, by the trade name "safepad."

In the context of the invention, the term "terminal" should be understood in a general sense. The aforementioned terminal can specifically be constituted by a personal computer running on various operating systems, such as WINDOWS or UNIX (both of which are registered trademarks). It can also be constituted by a workstation, a portable computer or a so-called dedicated card terminal.

Likewise, in the context of the invention, the term "internet network" includes, in addition to the Internet per se, private enterprise networks or the like, known as "intranets," and the networks that extend them to the outside, known as "extranets."

Smart cards are used in various fields: banking and health care applications, as so-called electronic "purses," etc. Moreover, several applications can coexist in a smart card (a multi-application smart card).

For these types of applications, smart cards can be assigned various functions. In particular, they can be used for security purposes. The term "security" should be understood in a general sense, including confidentiality and/or the authentication of the user of the station and/or the holder of the smart card itself.

In the more specific context of these applications, the terminal can be equipped with a secure enclosure comprising a smart card reader, a keyboard and possibly one or more other computing resources.

Figure 1:
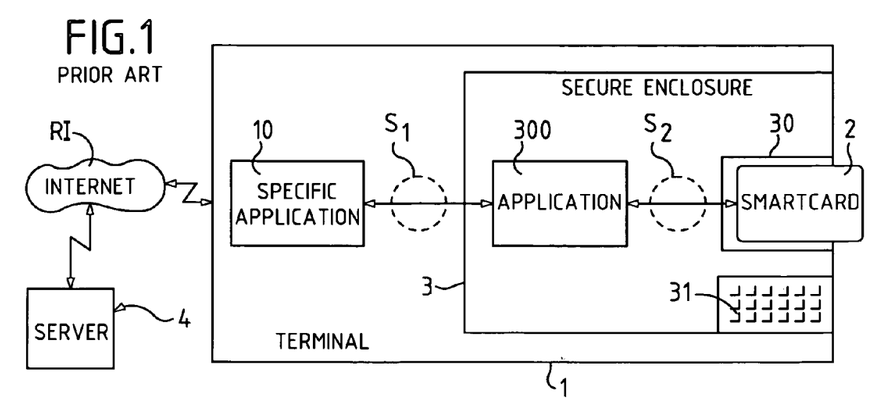
FIG. 1 schematically illustrates an example of a terminal according to the prior art comprising a secure enclosure equipped with a smart card reader and a keyboard.

FIG. 1 schematically illustrates the architecture of a terminal of the aforementioned type, according to the prior art.

To illustrate the concepts, it is assumed that the terminal 1 is basically constituted by a microcomputer. It is equipped with all the usual devices constituting such computing equipment and required for their proper operation (which are not represented): central processor, RAM, mass storage (hard disk), reader(s) information media (diskettes, etc.). In the particular case illustrated in FIG. 1, the terminal 1 is equipped with a secure enclosure 3 comprising a smart card 2 reader 30 and a keyboard 31. The keyboard 31 is specifically used to enter data for authenticating the holder of the smart card 2: for example a password associated with an identifier of the smart card 2. Various electronic circuits allow communication between the secure elements present inside this enclosure, including the keyboard 31 and the smart card 2 (via the reader 30), and between these secure elements and the non-secure elements present in the terminal 1.

Normally, the terminal comprises, in its non-secure part, a specific application 10, which will be hereinafter be called a "merchant" application, which handles the management and control of specific transactions permitted by the terminal 1 in question. Communications between this application 10 and the elements inside the secure enclosure 3 normally take place in accordance with a standard of the RS232 type. Communications between the elements inside the secure enclosure 3, including a resident application 300, and the smart card 2, via the reader 3, normally take place in accordance with a protocol that complies with the ISO standards 7816-1 through 7816-4.

This type of architecture specifically has the following primary drawbacks:

the merchant application installed in the terminal (non-secure part) and that residing in the secure enclosure are specific to this terminal;

the associated computer programs are generally voluminous; and flexibility and reliability are limited, since any modification of these programs requires a reloading of programs into the terminal (non-secure part) and into the secure enclosure, and thus possibly the execution of functional tests, which requires the presence of specialized personnel.

Generally, the latter operation must be repeated for a large number of terminals.

It must also be kept in mind that these applications must be fully or partially secure. It is therefore necessary to be able to guarantee, for the updating of the programs, a given level of security, appropriate for the specific application.

Most often, the terminal 1 is not isolated, in the sense that it is linked via a transmission network RI to one or more remote systems, one of which 4 is illustrated in FIG. 1. The nature of the network RI can vary, depending on the applications envisaged (banking, health care, etc.). It could be the Internet or a network of that type (intranet or extranet), given the rapid growth of the latter type of network and the applications that use it. Normally, the overall architecture is of the so-called "client-server" type, the "server" generally being the remote system 4 and the "client" being the terminal 1. But under certain circumstances, the roles may be reversed or alternated during the time of a transaction.

In an architecture of this type, the programs associated with the specific application 10 and the application 300, during a modification of their version for any reason whatsoever, can be updated in a centralized way, from one of the remote servers, for example the server 4. It follows that one of the drawbacks indicated can be alleviated, the update being performed by downloading. These operations, however, require the implementation of administrative procedures that are well known. Moreover, the download can include sensitive data, or at least should not allow the installation into the terminal of programs and/or procedures that are unauthorized or dangerous for security (a "Trojan horse," "logical bombs," viruses, etc.).

Furthermore, with the increase in power and the universality of the Internet, there is a need to make the aforementioned specific applications, installed locally in the terminals, "migrate" to the remote servers, which will hereinafter be called "merchant servers," and to dialog directly with the smart card from these merchant servers.

This second need, in particular, cannot be satisfied by the terminals of the prior art, for reasons that will be explained below.

But first, it seems useful to briefly describe a system architecture that allows communication between a terminal according to the prior art and a remote server, via an internet network RI. An architecture of this type is represented schematically in FIG. 2, a figure in which the logical architecture of the terminal, references 1', is more particularly represented.

Figure 2:
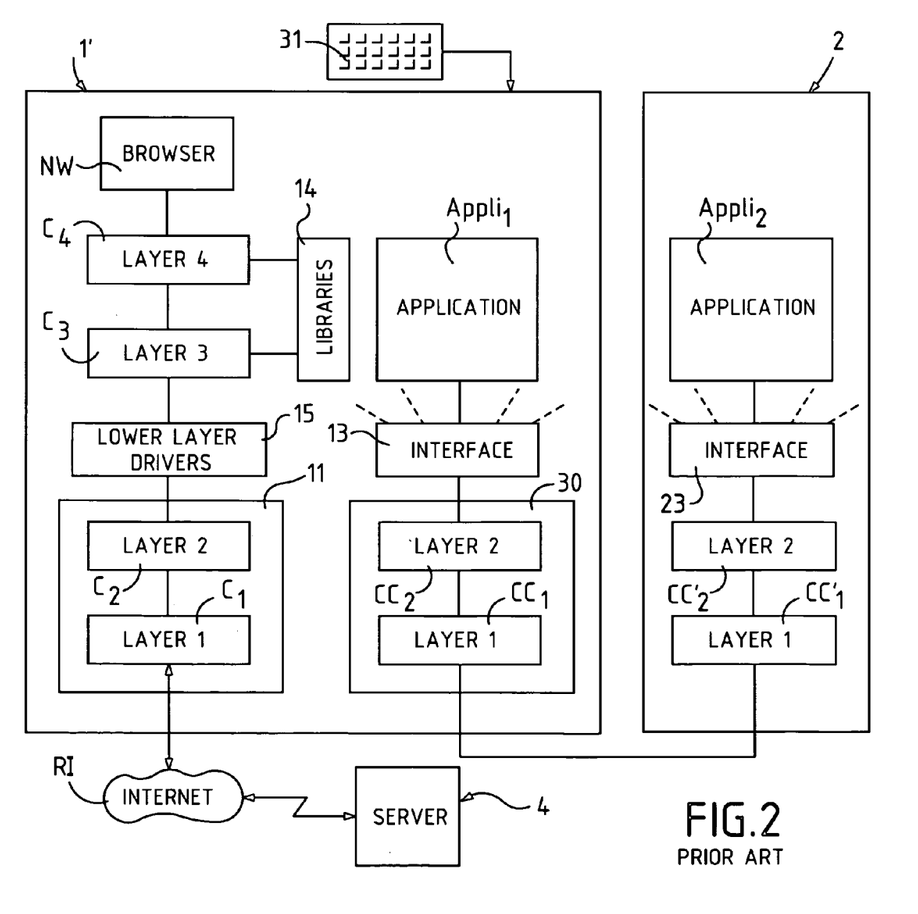
FIG. 2 illustrates, in a general way, the logical architecture of a terminal according to the prior art comprising a smart card reader and communicating with a web server via the internet network.

The terminal 1' in this case is a general type of terminal which may or may not be secure, this characteristic being unimportant for explaining the various types of communication in question.

As indicated above, the terminal 1' naturally includes all the circuits and devices required for its proper operation, which are not represented in order to simplify the drawing. Normally, the terminal 1' is also connected to standard peripherals, which may or may not be integrated, such as a display screen (not represented) and a keyboard 31, located in a secure enclosure (FIG. 1: 3) in the particular context of the invention.

Normally, communications in networks take place in accordance with protocols that comply with standards comprising several superposed software layers. In the case of an internet network RI, communications take place in accordance with protocols that are specific to this type of communication, but that also comprise several software layers. The communication protocol is chosen based on the application specifically envisaged: web page consultation, file transfers, e-mail, forms or news, etc.

The architecture of communication networks is described by various layers. For example, the OSI ("Open Systems Interconnection") standard defined by the ISO includes seven layers, which run from the so-called lower layers (for example the so-called "physical" layer that concerns the physical transmission medium) to the so-called upper layers (for example the so-called "application" layer), passing through intermediate layers, including the so-called "transport" layer. A given layer offers services to the layer that is immediately above it and requires other services from the layer that is immediately below it, via appropriate interfaces. The layers communicate by means of primitives. They can also communicate with layers on the same level. In certain architectures, one or another of these layers may be nonexistent.

In an Internet environment, there are five layers, and more precisely, going from the top layer to the bottom layer: the applications layer (http, ftp, email, etc.), the transport layer (TCP), the network address layer (IP), the data link layer (PPP, Slip, etc.) and the physical layer.

The terminal 1' includes circuits 11 for accessing the internet network. This could be a modem for connecting to a switched telephone line or an integrated services digital network (ISDN), for example via an Internet service provider (or ISP). The circuits 11 for accessing the network RI contain the lower software layers $C_1$ and $C_2$, which correspond to the aforementioned physical and data link layers.

Also represented are the upper layers $C_3$ and $C_4$, which correspond to the "network address" (IP) and "transport" (TCP) layers. The upper application layer (http, ftp, email, etc.) is represented schematically by a web browser NW of any type, preferably a standard type on the market.

The interface between the lower layers $C_1$ and $C_2$ and the upper layers $C_3$ and $C_4$ is constituted by a software layer 15, generally called a "lower level driver." The upper layers $C_3$ and $C_4$ are supported by this interface and are implemented by means of libraries of specific functions, or network libraries 14, with which they correspond. In the case of the Internet, TCP/IP is implemented by means of libraries called "sockets."

This organization allows the browser NW to present requests to a remote server 4, in order to consult web pages (HTTP protocol), transfer files (FTP protocol), or send email (email protocol).

The terminal 1' also includes the card reader 30, located in a secure enclosure (FIG. 1: 3) in the particular context of the invention. To communicate with the smart card 2, the card reader 30 also includes two lower layers $CC_1$ (physical layer) and $CC_2$ (data link layer), which play a role similar to the layers $C_1$ and $C_2$. The software interfaces with the layers $CC_1$ and $CC_2$ are described, for example, by the PC/SC specification ("Part 6, Service Provider"). The layers $CC_1$ and $CC_2$ themselves are specifically described by the ISO standards 7816-1 through 7816-4.

An additional software layer 13 forms an interface between application layers, under the single reference $Appli_1$, and the lower layers $CC_1$ and $CC_2$. The chief function devolved to this layer 13 is a multiplexing/demultiplexing function.

On the smart card 2 end, there is a similar organization, i.e., the presence of two lower layers, referenced $CC'_1$ (physical layer) and $CC'_2$ (data link layer), as well as an interface layer 23, entirely similar to the layer 13. This layer 23 provides an interface between the aforementioned protocol layers $CC'_1$ and $CC'_2$ and one or more application layers, represented in the form of a single module referenced $Appli_2$.

Communications between the smart card reader 30 and the smart card 2 take place by means of standard commands, known by the abbreviation APDU, for "Application Protocol Data Unit").

Various protocols can be used, including as non-exhaustive examples the following:

the ETSI GSM 11.11 recommendation;

the protocol defined by the ISO 7816-3 standard, in character mode T=0;

the protocol defined by the ISO 7816-3 standard, in block mode T=1;

or the protocol defined by the ISO 3309 standard, in HDLC (for High-Level Data Link Control procedure) frame mode.

Within the scope of the invention, the ISO 7816-3 protocol is preferably used, in block mode.

In an intrinsically known way, each protocol layer is associated with a certain number of primitives that allow data exchanges between layers of the same level and from one layer to another.

In the current state of the art, it is not possible to place the smart card in direct communication with a remote server 4 via the Internet RI, since the communication protocol with a standard type of smart card 2, as indicated above, is incompatible with those used in the Internet or in any network of this type. Nor is it possible to establish direct communications between the browser NW and the smart card 2, except by installing in the browser NW a piece of software, called a "plug-in," of a specific type.

Referring again to FIG. 1, assuming that the terminal 1 is linked to the Internet, and to summarize what has been mentioned above, it is noted that this terminal 1 according to the prior art, comprising a secure enclosure 3 equipped with a keyboard 31 and a smart card 2 reader 30, includes two main communication interfaces, $S_1$ and $S_2$, represented in dotted lines. A first interface $S_1$ links the enclosure 3 to the terminal 1 per se in which the merchant application 10 is run, and a second interface $S_2$ is provided for communications with the smart card 2. In reality, the interface $S_2$ is distributed between the application 300 and the smart card 2. Added to both of these interfaces is the interface to the outside (FIG. 2: particularly the circuits 11), which allows the terminal 1 to communicate with the internet network RI. The interface $S_1$ accepts two levels of dialogue: a first, transparent dialogue for which a command sent by the terminal 1 is executed without semantic modification by the interface $S_2$, and a second level of dialogue that involves the application 300.

Thus, the authentication by entering a password on the keyboard 31 is a command submitted to the interface $S_1$ that is interpreted by the application 300 and transformed into a series of exchanges via the interface $S_2$ between the application 300 and the smart card 2. The result of these exchanges is transmitted to the interface $S_1$.

Other than the fact that it is impossible, in the current state of the art, for a standard smart card 2 to accept direct exchanges with the Internet RI, as indicated above, the major drawback of the terminals according to the prior art is constituted by the presence of the resident application 300. It is most often a so-called "proprietary" application, which means that the merchant application 10 must be written based on the characteristics and the type of the terminal used. It is therefore a priori different from one type of terminal to another, which does not facilitate maintenance operations. Moreover, it is not adapted to an Internet type of environment.

Standards have been proposed for applications of the same type as the invention, such as the standard known by the abbreviation OCF (for "Open Card Framework"), which attempts to standardize exchanges between the merchant terminal 1 and the smart card 2 reader 30 in compliance with, for example, the EMV standard for terminals. However, such a standard is not directly usable in an internet context.

There is also the so-called "C-SET" protocol, known in the field of banking applications defined by the GIE bank card. Using this protocol, a user connects to a merchant site available on the web and makes a purchase. During the transaction, the latter accesses elements of the secure enclosure in order to authenticate the holder of the bank card making the purchase. This authentication is performed by running software in the terminal (non-secure part) and the enclosure.

This protocol is not free of drawbacks, either:

it requires the presence of specific software in the terminal and in the enclosure;

it requires the certification of the software required by C-SET;

the C-SET protocol is payment-oriented only; the software in the terminal that processes the information from the web server and from the bank card payment is payment software.

In these characteristics, it does not differ much from the solutions of the prior art mentioned above. It does not allow end-to-end communications using an Internet protocol, including direct addressing of the smart card. Given its specificity, it offers no flexibility and is not adapted for use in other fields: health care, updating of data stored in a smart card, point crediting, etc

SUMMARY OF THE INVENTION

While eliminating the drawbacks of the methods and architectures of the prior art, some of which have been mentioned, the object of the invention is to fulfill the needs that have arisen.

It promotes the utilization in the Internet of terminals comprising a secure enclosure equipped with at least a smart card reader and a keyboard, by allowing the migration of applications from smart card readers and terminals to a remote web server, and direct dialogue with the smart card.

It allows an updating or an addition of software in the secure enclosure, with maximum security.

To achieve this, according to a first aspect of the invention, the smart card is not addressed in standard fashion by APDUs in accordance with the aforementioned ISO 7816 communication protocol, but by using a URL address (for "Universal Resource Locator"). As is known, a URL address is constituted by an IP address per se and a port number. In the same way, the secure enclosure uses this URL addressing.

According to one aspect of the invention, the smart card also acts like a web server and/or client.

The secure enclosure according to the invention is "transparent" for the internet network, in the sense that the "card commands" emanating from the remote merchant server do not involve elements for addressing the terminal. It follows that the resources associated with the secure enclosure are not accessible from the internet network. On the other hand, the applications contained in the smart card have the capability to address and activate all the computing resources present in the secure enclosure, including a keyboard, by simply using URL addressing, as will be explained below.

To achieve this, the terminal physically comprises:

a secure enclosure of a modified type, comprising at least a card reader and a keyboard (and/or another computing resource), both of which are linked to a so-called secure-enclosure HTTP server, as well as an execution unit that manages all of the resources present in the enclosure; and in addition to the standard elements (memories, etc.) and a web browser, a first, so-called terminal communication node, which handles communications between the internet network, the web browser and/or the secure enclosure.

Furthermore, the aforementioned secure enclosure comprises a second, so-called enclosure communication node, which handles communications between the terminal itself, via the first communication node, the so-called secure-enclosure HTTP server, and/or the smart card reader.

The smart card itself is equipped with a third, so-called card communication node, and a software adaptation that acts like an HTTP server, forming an interface between at least one application resident in the smart card and the second communication node.

The first communication mode routes the requests from the internet network having a port number associated with the secure enclosure to this enclosure and performs the necessary protocol adaptations for placing the internet network in direct communication with the second communication node, and handles the propagation of information and/or orders to the smart card.

For certain applications, especially applications requiring a high level of security, the secure enclosure can advantageously comprise one or more additional computing resource(s), such as for example devices for biometric authentication (ocular recognition, voice and/or signature recognition), a coprocessor, or an external interpreter.

In a preferred variant of the method according to the invention, the programs required to run the elements and resources of the secure enclosure, or to update them, are downloaded via the internet network from a remote web server linked to this network. The update may include at least the partial erasure of these programs.

It is also possible, in additional variants of embodiment, to download, update and/or delete applications or parts of applications stored in the smart card (files, programs, scripts, etc.) via the internet network and the communication modes.

All of these operations can be performed under very good security conditions, due to the aforementioned transparency of the secure enclosure relative to the internet network.

Hence, the main object of the invention is a terminal equipped with a secure enclosure designed to communicate with at least one web server via an internet network, using a first Internet communication protocol, said secure enclosure comprising at least one smart card reader, said smart card storing at least one software application, characterized in that said terminal comprises a non-secure part comprising at least a first module called a first communication mode, said secure enclosure comprises at least a second module called a second communication node and said smart card comprises at least a third module called a third communication node, in that said communication nodes comprise, respectively, first, second and third protocol stacks, each comprising a given number of so-called standard software communication layers, and respectively, first, second and third pieces of specific software, each comprising at least one first software entity, said first software entities being paired two by two, in that said first node authorizes at least communications between said terminal and said web server, using said first Internet communication protocol, in that said first entities of said first and second pieces of specific software authorize the establishment of a bilateral data exchange session between said terminal and said secure enclosure, using a second given communication protocol, in that said first entities of said second and third pieces of specific software authorize at least the establishment of a bilateral data exchange session between said secure enclosure and said smart card, via said smart card reader, using a third given communication protocol, so as to be able to connect at least one of said software applications of the smart card with said web server.

BRIEF DESCRIPTION OF THE DRAWINGS

The invention will now be described in greater detail by referring to the attached drawings, in which.

DESCRIPTION OF THE PREFERRED EMBODIMENT(S)

Figure 3:
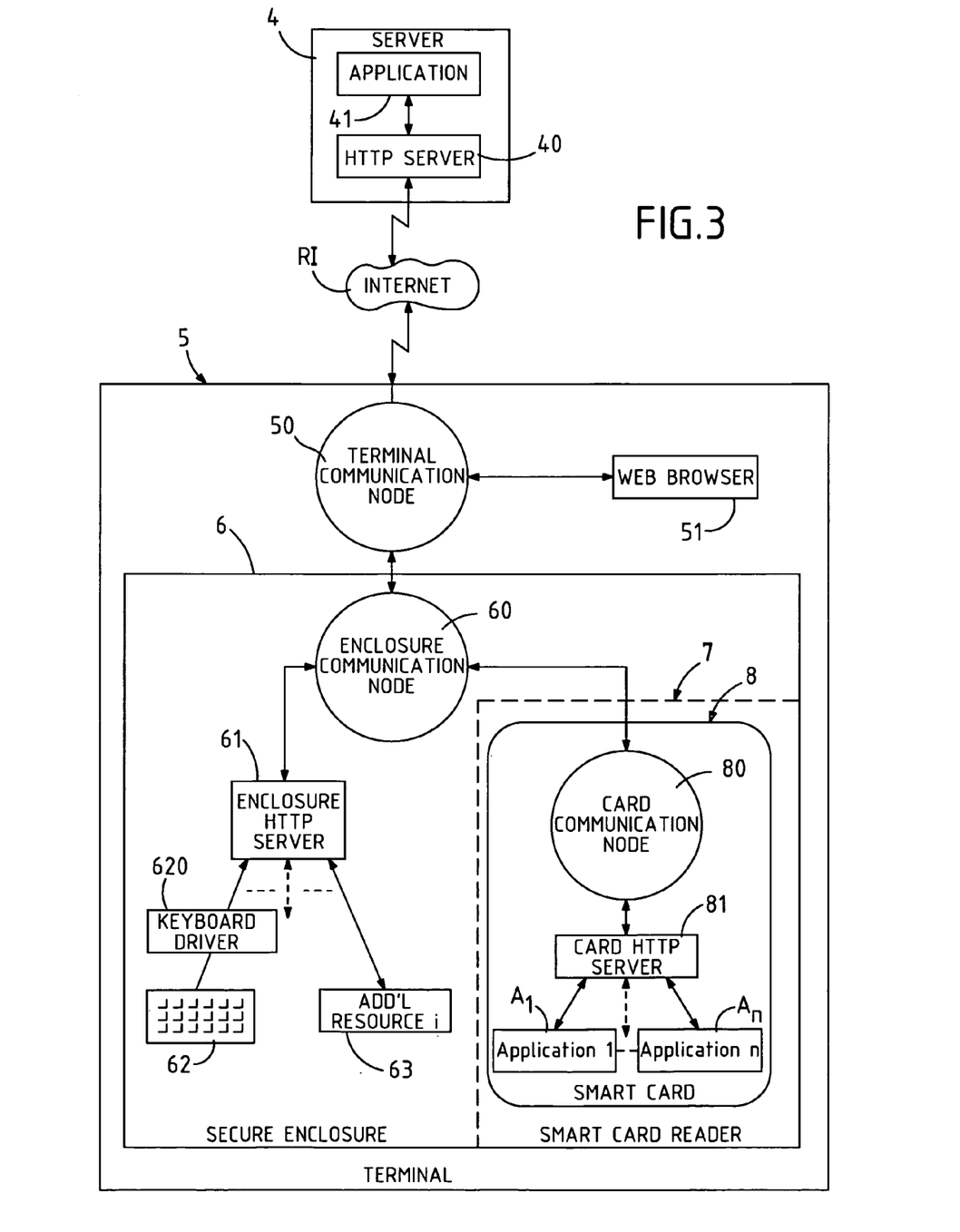
FIG. 3 schematically illustrates an exemplary general architecture according to the invention allowing communications, via the internet network, between a remote so-called merchant server and a terminal equipped with a secure enclosure comprising a smart card reader, a keyboard and other computing resources.

We will now describe an exemplary embodiment of a terminal with a secure enclosure according to the invention and the system architecture for communication between this terminal and a so-called "merchant" server, with reference to FIG. 3.

The terminal, hereinafter referenced 5, can basically be embodied, as has been indicated, by a microcomputer or a similar device. It comprises a certain number of standard elements: microprocessor, RAM and ROM, mass storage (hard disk, etc.), etc., which are not represented and are well known to one skilled in the art. On the other hand, in the application specific to the invention, the terminal 5 comprises an enclosure 6, secured by physical and logical means that are intrinsically known. This secure enclosure 6 comprises elements common to the prior art, but also elements specific to the invention that will be indicated below. To begin with, it comprises, as in the prior art, a keyboard 62, its driver or "handler" 620, and a smart card reader 7.

The terminal 5 is connected to a remote server 4 via the Internet RI or any other network of this type (intranet, extranet). As in the case of FIG. 2, it comprises all of the software and hardware elements that make it possible to communicate using one of the protocols used on the Internet, including the HTTP/TCP-IP protocol. It is therefore unnecessary to describe these elements, except to mention that it includes a web browser, referenced 51. This browser 51 makes it possible, in particular, to present requests to the server 4. It constitutes one of the applications present in the terminal 5, which can actually include a plurality of applications.

According to a first characteristic of the invention, the applications specific to the merchant application have migrated to the server 4. The latter therefore specifically comprises an HTTP server per se 40 and the aforementioned merchant applications, stored in storage means 41.

According to another characteristic of the invention, the terminal comprises a first specific module 50, which will be called the first communication node, or "terminal communication node." This module 50 comprises standard communication means, including the protocol stacks described in connection with FIG. 2, but also specific elements that will be described below.

According to yet another characteristic, the secure enclosure 6 also comprises a specific module 50, which will be called the second communication node or "enclosure communication node."

The first communication node 50 makes it possible to make the servers of the network RI, for example the server 4, as well as the applications present in the non-secure part of the terminal 5 (for example the web browser 51) communicate with the elements present in the secure enclosure 6, including the smart card reader 7 and the smart card 8, via the second communication node 60.

The secure enclosure 6 comprises an HTTP server 61, which will be called the "enclosure HTTP server," disposed between the second communication node 60 and the keyboard 62. The latter constitutes one of the computing resources of the secure enclosure 6. The latter, as indicated in the preamble of the present specification, can comprise additional resources 1 through i, represented by the single reference number 63. These can include, for example, biometric authentication devices, a coprocessor or an external interpreter. The resource(s) 63 is (are) also connected to the HTTP server 61, in a way similar to the keyboard 62.

The server HTTP 61 is also connected to the smart card reader 7.

The communication node 60 makes it possible to route the requests from the terminal 5 to the smart card 8, via the smart card reader 7, and to route, in the opposite direction, the requests from the smart card 8, either to the HTTP server 61 or to the terminal 5, via the communication node 50.

According to one aspect of the invention, the HTTP server 61 allows the smart card 8, and it alone, to use the resources 62 through 63 of the secure enclosure 6.

The impossibility of accessing the information in the keyboard 62 or in the other resources 63, except than by passing through the smart card 8, which plays an intermediary role, is due to several factors:

a/ the enclosure 6 is physically secure (it is physically impossible to "spy" on the elements);

b/ the programming of the node 60 is such that it prevents any routing of data originating from outside the enclosure HTTP entity 61, the node 60 also being protected, since it is located inside the secure enclosure 6; and c/ the programming of the enclosure HTTP entity 61 is such that the latter does not accept requests other than those emanating from the smart card 8, this server 61 also being protected, since it is also located inside the secure enclosure 6.

While point a/ itself is common to the prior art and to the invention, points b/ and c/ constitute specific and advantageous characteristics of the invention.

We will now describe in greater detail how communications take place between the internet network RI and the elements of the non-secure part of the terminal 5, between the latter and those of the secure terminal 6, between the elements of the secure terminal 6, and between the latter and the smart card 8 via the smart card reader 7.

According to one of the main characteristics of the invention, all of these communications take place in a mode that will be qualified as "homogeneous," entirely compatible with Internet protocols, using a standard URL address, and retaining the standardized communication protocols, particularly between the smart card 8 and the smart card reader 7 (i.e. in compliance with the aforementioned ISO 7816 standards).

The communications between the web browser 41 and the "merchant" server 4 do not pose any particular problems and can take place normally in accordance with the HTTP protocol, using standard protocol layers (see FIG. 2), and URL addressing. On the other hand, as has been mentioned, in the prior art, this is not true between the non-secure and secure elements of a terminal (FIG. 1: 1), in which communications normally take place in RS232 mode, or between the elements of the secure enclosure 6 and the smart card 8 via the reader 7. In the latter case, as explained in connection with FIG. 2, the communications do take place by implementing protocol layers, but with the help of a set of APDU orders, in compliance with the aforementioned ISO 7816-3 standard, hence in a way that is incompatible with an Internet protocol.

Also, the invention offers specific provisions that make it possible to unify the communications, while retaining the standardization of the elements involved in the communications and resulting in only minor modifications.

First of all, we will describe in detail the modifications to be made to the secure enclosure 6 and the smart card 8, so as to be able to handle communications between these two entities in a manner according to the invention.

According to one characteristic of the invention, the smart card 8 is equipped with a specific module constituting a third communication node 80 and an HTTP server 81, which will hereinafter be called the "card communication node" and the "card HTTP server," respectively. The n application(s) present in the smart card 8, $A_1$ through $A_n$, are connected through a first side of the HTTP server 81. With these provisions, the smart card 8 is transformed into a web server and/or client for the secure enclosure 6 and can be "addressed" by a URL address.

This architecture is essentially obtained, according to the invention, by installing a first specific communication protocol layer into the smart card 8. Likewise, a second specific communication protocol layer, forming the match of the first, is installed in the secure enclosure 6.

Figure 4:
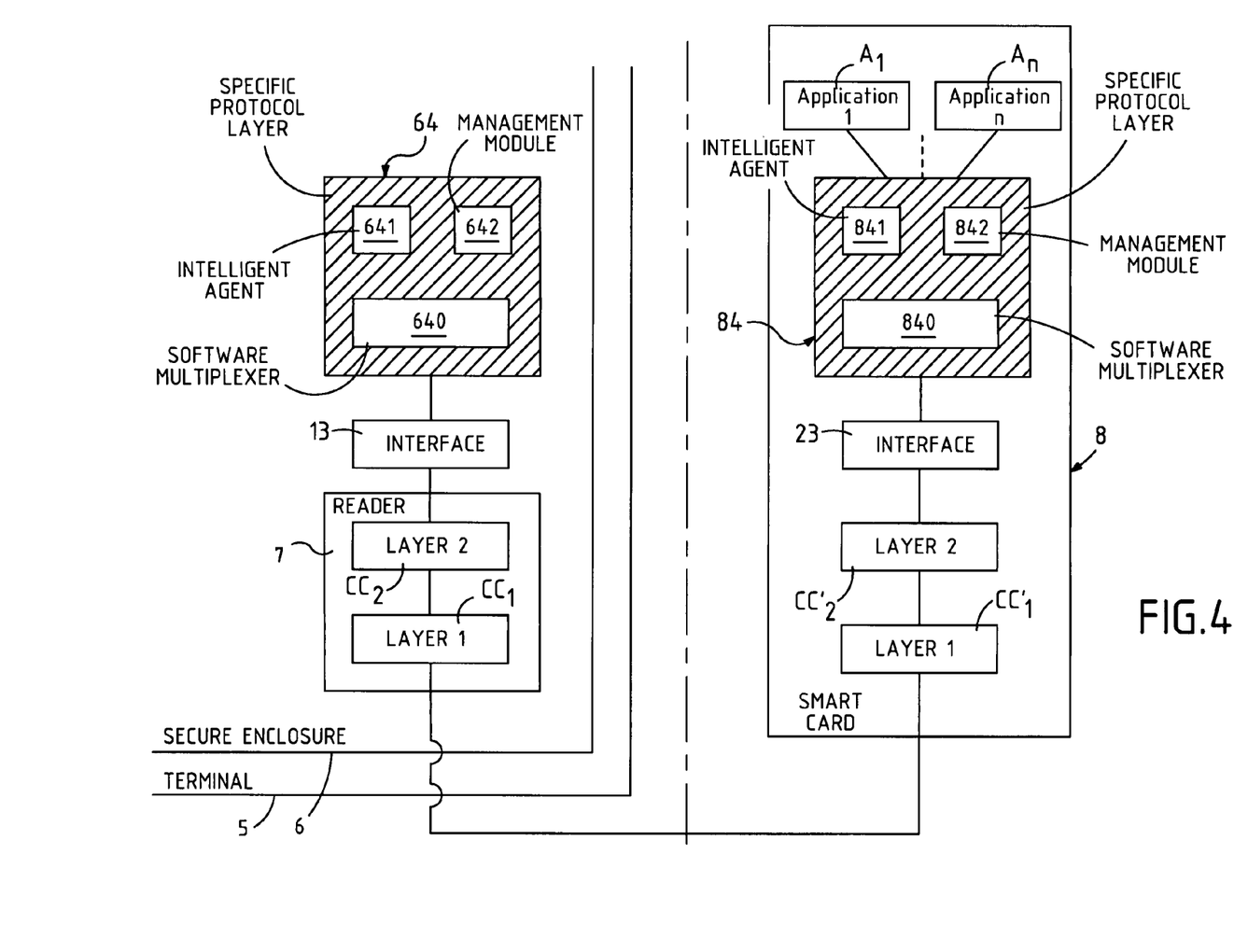
FIG. 4 illustrates the logical architecture of modules allowing communications between the secure enclosure of the terminal of FIG. 3 and the smart card.

For the exchanges between the smart card 8 and the secure enclosure 6, the block diagram of FIG. 3 can be represented by the logical architecture illustrated by FIG. 4.

In this architecture, we find the protocol layers of the prior art, as illustrated by FIG. 2, which play the same roles and have the same references. It is therefore unnecessary to describe them again.

On the other hand, on either end, i.e., in the secure enclosure 6 and in the smart card 8, two additional specific protocol layers are provided, respectively 64 and 84.

In the secure enclosure 6, the specific layer 64 is interfaced with the protocol layers of the card reader 3, i.e., the lower layers $CC_1$ and $CC_2$, via the multiplexing layer 13. The specific layer 64 allows the transfer of data packets to and from the smart card 8. In addition, it adapts the existing applications for utilizations involving the smart card 8, without having to rewrite them.

On the smart card 8 end, there is an entirely similar organization, constituted by an additional instance of the specific layer, referenced 84, the match of the layer 64.

More precisely, the specific layers 64 and 84 are subdivided into three main software elements:

a module, 640 or 840, for transferring blocks of information between the layers 13 and 23, via the conventional layers $CC_1$, $CC_2$, $CC'_1$, and $CC'_2$.;

one of more pieces of software called "intelligent agents," 641 or 841, which perform, for example, protocol conversion functions;

and a module for managing the specific configuration, 642 and 842 respectively, a module that is comparable to a particular intelligent agent.

Therefore, in the secure enclosure 6 and the smart card 8, there is a communication protocol stack between the two entities.

The level-two entities (data link layers) $CC_2$ and $CC'_2$ handle the exchanges between the smart card 8 and the secure enclosure 6. These layers are responsible for detecting, and possibly correcting, transmission errors. The various protocols mentioned are usable for this purpose (the ETSI GSM 11.11 recommendation; the protocol defined by the ISO 7816-3 standard, in character mode T=0 or in block mode T=1; or the protocol defined by the ISO 3309 standard, in HDLC frame mode). As indicated, within the context of the invention, the ISO 7816-3 protocol, in block mode, is preferably used.

In an intrinsically known way, each protocol layer is associated with a certain number of primitives that allow data exchanges between layers of the same level and from one layer to another. For example, the primitives associated with the level-two layer are of the data request ("Data.request") type and data response by the card ("Data.response") type, as well as the data confirmation ("Data.confirm") type.

More particularly, the specific layers 64 and 84 are responsible for the dialogue between the smart card 8 and the host, i.e., the secure enclosure 6. They also allow the establishment of a configuration adapted to the sending and/or reception of data packets.

As indicated above, the layers comprise three distinct entities.

The first entity, the module 640 or 840, is essentially constituted by a software multiplexer. It allows the exchange of information between the smart card 8 and the host terminal 6, in the form of protocol data units. It plays a role similar to that of a data packet switcher. These units are sent or received via the level-2 layer (data link layer). This particular communication protocol makes it possible to place at least one pair of "intelligent agents" in communication. The first agent of each pair, 641, is located in the layer 64 on the secure enclosure 6 end; the second, 841, is located in the layer 84, on the smart card 8 end. A link between two "intelligent agents" is associated with a session. A session is a two-way data exchange between these two agents.

An intelligent agent can perform all or some of the functions of the level three and four layers, depending on the configuration implemented by the secure enclosure 6.

A particular intelligent agent is advantageously identified by a whole number, for example in 16 bits (a number between 0 and 6535). This identifier is used, for example, in a protocol data unit constituting a destination reference and a source reference.

There are two main categories of intelligent agents: agents of the "server" type, which are identified by a fixed reference, and agents of the "client" type, which are identified by a variable reference, delivered by the configuration management module 642 or 842.

The process for opening a session is normally the following: an intelligent agent of the "client" type opens the session with an intelligent agent of the "server" type. The modules 642 and 842 manage tables (not represented) which contain a list of the intelligent agents present, on the host 6 end and smart card 8 end.

The intelligent agents, 641 or 841, are associated with particular properties or attributes. To illustrate the concept, and to give a non-limiting example, the following four properties are associated with intelligent agents:

"host": agent located in the secure enclosure;
"card": agent located in the smart card;
"client": agent that initializes a session;
"server": agent that receives a session request.

The intelligent agents make it possible to exchange data.

The configuration management modules, 642 and 842, respectively, are comparable, as has been indicated, to particular intelligent agents. For example, the module 642 on the host 6 side, specifically manages information related to the configuration of the secure enclosure 6 (operating modes), a list of the other agents present, etc. The module, 842, on the smart card 8 side, has similar functions. These two agents can be placed in communication with one another to establish a session.

According to one characteristic of the invention, the smart card 8 offers the host system, i.e. the enclosure 6, a virtual terminal model. To do this, the smart card 8 acts like a web server and/or client.

In a practical way, the smart card 8 is advantageously "addressed" using a URL address that defines a loopback to the terminal 5, and more particularly to the secure enclosure 6, and not a pointing to an external server like the server 4. For example, the structure of this URL is normally the following:

http://127.0.0.1:8080 (1) or
http://localhost:8080 (1a)

in which 127.0.0.1 is the IP loopback address ("localhost" being the literal translation of 127.0.0.1) and 8080 is the port number. The URL address of the resources 62 and/or 63 could be completed by a suffix of the "/xxx" type. For example, the management module 620 of the keyboard 62 could have the following as its URL address:

http://localhost:8080/kb (2)

The logical architecture that allows communications between the terminal 5 per se (between the nodes 50 and 60), i.e. the non-secure elements of the latter, and the secure enclosure 6 is similar to that represented in FIG. 4. Consequently, sessions can be established between the communication nodes 50 and 60 in accordance with the general schema that has just been described. The secure enclosure can particularly be addressed by a URL address, under the same port number as the smart card, or 8080 in the example described.

The communication node 50 also allows the terminal 5 to communicate with the internet network RI. Also, in addition to the properties associated with the intelligent agents, which are listed above, there are also the following two properties:

"local": agent that does not communicate with the network;
"network": agent that communicates with the network.

The terminal 5, in its entirety, is addressed by the same IP address as above. It hosts at least one so-called terminal application, advantageously the web browser 51. The latter is associated with a particular port.

For example, using a web page technique and hyperlinks, a user (not represented) can choose a product or a service from those available and transmit the request to the merchant server 4.

In addition to the web client-server function offered by the smart card 8, according to another aspect of the invention, included in the latter there is a mechanism similar to the so-called CGI (for "Common Gateway Interface") function installed in conventional web servers.

Before describing an exemplary architecture according to the invention that makes it possible to perform a function of this type, even in the smart card 8, it is useful to review the chief characteristics of a CGI operating mode.

CGI is a specification for implementing, from a web server, applications written for the UNIX (registered trademark), DOS or WINDOWS (registered trademark) operating systems. By way of example, for the UNIX operating system, the specification is CGI 1.1 and for the Windows 95 operating system, the specification is CGI 1.3.

Again by way of example, an HTTP request for a URL address of the type

"http://www.host.com/cgi-bin/xxx" (3), in which "host" refers to a host system (generally remote), is interpreted by a web server as the execution of a CGI-type command script named "xxx" and present in the directory "cgi-bin" of this host system. Although the directory can have any name a priori, by convention, this is the name given to the directory that stores scripts of the CGI type. A script is an instruction set of the operating system of the host system, whose final result is transmitted to the web browser that sent the aforementioned request or to any other application accessing the service, such as a merchant server. Various languages can be used to write this script, for example the language PERL (registered trademark).

In a practical way, the request is normally displayed on a computer screen in the form of a form contained in an HTML page. The language HTML makes it possible to post a form at a URL address. The form includes one or more fields, which may or may not be required, and which are filled in by a user using the usual entry means: a keyboard for text, a mouse for boxes to be checked or so-called "radio" buttons, etc. The contents of the form (and possibly so-called "hidden" information and instructions) is addressed to the web server. The HTML code of the page describes the physical structure of the form (frame, graphics, color and any other attribute), as well as the structure of the data fields to be filled in (name, length, data type, etc.).

The transmission can take place in two main types of HTTP formats. A first format uses the so-called "POST" method, and a second uses the so-called "GET" method. A piece of format type information is present in the code of the form page.

This mechanism, however, is not directly transposable to a smart card, even though the latter offers the web server functionality according to one of the characteristics of the invention.

Figure 5:
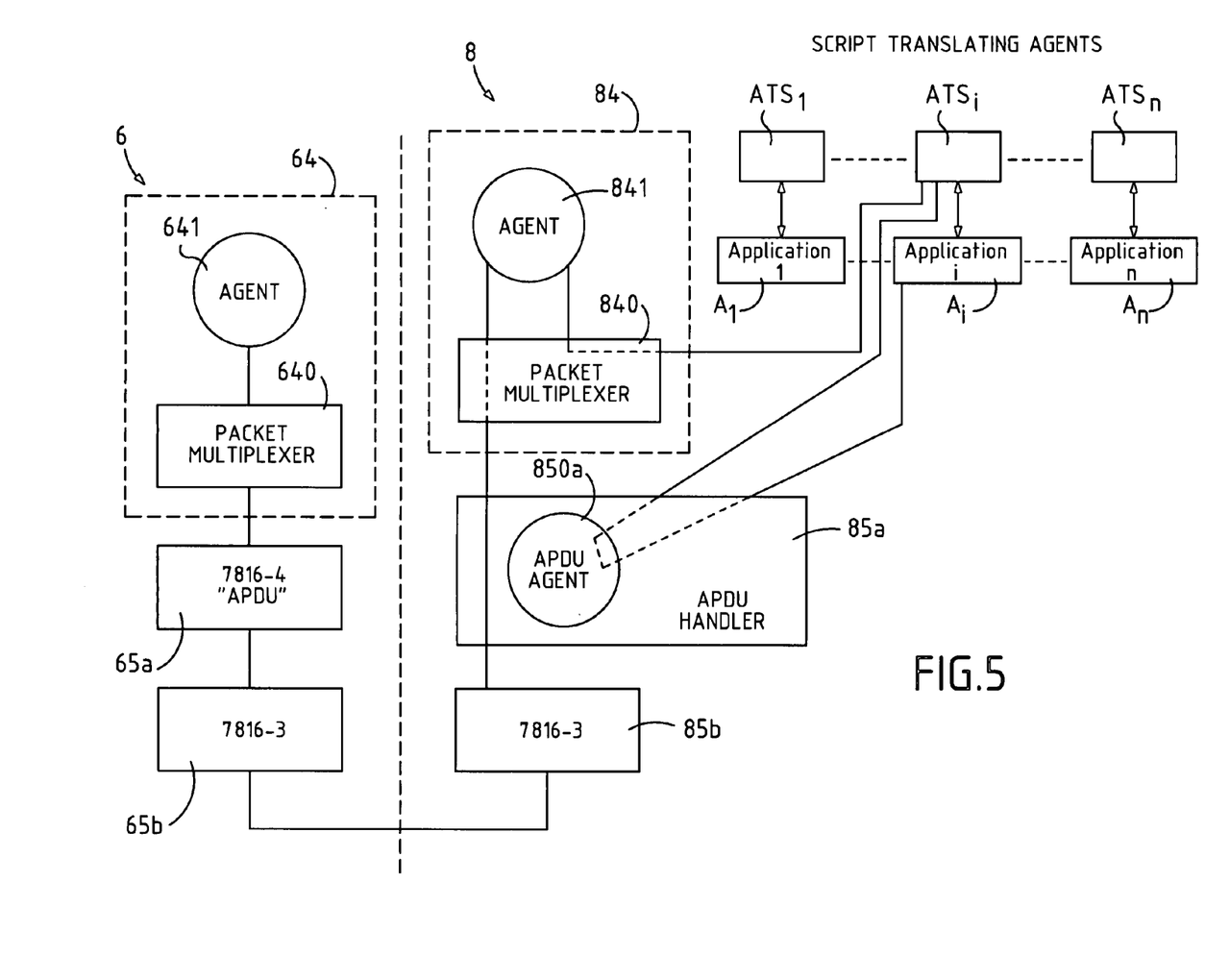
FIG. 5 illustrates a particular embodiment of the logical architecture of the smart card.

We will now describe an exemplary architecture that makes it possible to activate any conventional type of application via a web server in the smart card, with reference to FIG. 5.

A merchant server 4 activates an HTTP request of the GET type at a URL address, which can be presented in the following way:

"http://@card:8080/xxx.8080/cgi-bin/le_cgi ? param1+ param2" (4), in which "@card" is the IP address of the terminal supporting the smart card (for example the loopback address "127.0.0.1" of the relation (1)), "le_cgi" is a particular CGI script to be executed in the smart card 8 and "param1" and "param2" are parameters to be entered into the aforementioned script. The request is first transmitted to the secure enclosure 6, via the communication nodes 50 and 60 (FIG. 3).

A session is established between the terminal and the smart card reader. Then another session is established between a pair of intelligent agents, 641 and 841, located in the specific layers of the secure enclosure 6 and the smart card 8, respectively 64 and 84. The data then passes through the packet multiplexer 640 of the specific communication protocol layer 64. It then passes through the standard protocol layers (see FIG. 2). However, in order to better illustrate certain specific aspects of the invention, which will be explained below, these layers are divided into two parts in FIG. 5: an APDU command handler 65a and lower protocol layers 65b(ISO 7816-3 standard).

Likewise, in the smart card 8, it passes through the lower protocol layers, referenced 85b, and the APDU command handler on the card end, referenced 85a, then the packet multiplexer 840, in order to be received by the intelligent agent 841, which will be called a "web agent."

It is appropriate to note that the data addressed to the web agent 841 are transported, in an intrinsically conventional way, in the form of APDU commands designed for the particular "packet multiplexer" application 840. The APDU command handler 85a selects this application in a way that is entirely similar to the other applications present in the smart card 8, $A_1$ through $A_n$. In other words, the packet multiplexer 840 is seen by the APDU command handler 85a as an ordinary card application.

The HTTP request is then analyzed by the web agent 841, which detects a reference to a particular directory, which will hereinafter be called "cgi-smart" by convention, and to a particular application, for example $A_i$. The complete path in this case is therefore "cgi-smart/$A_i$".

According to one characteristic of the method of the invention, the above entity designates a particular script associated with an equally particular application.

According to another aspect of the invention, particular intelligent agents are installed in the smart card 8, which will hereinafter be called "script translating agents," or in abbreviated fashion, "ATS." The script is then interpreted by one of the intelligent agents. This translation can be performed in various ways:

a/ by the web agent 841 itself, which in this case is equipped with a dual capacity;

b/ by a single script agent capable of translating all of the scripts present in the smart card 8;

c/ by a dedicated script agent which will hereinafter be called "ATSD" (one per script); or d/ by an APDU agent 850a of the APDU command handler 85a, which in this case is equipped with a dual capacity.

The APDU agent 850a is a component of the APDU command handler layer 85a. The latter is a layer capable of centralizing all of the APDU commands sent and/or received by the system, of selecting applications from $A_1$ through $A_n$, but also of offering an intelligent agent type interface. It is therefore capable, according to one of the characteristics of the invention, of communicating with all of the intelligent agents (via sessions), whether these agents are located in the enclosure 6 or the smart card 8.

In case c/ above, a session is opened between the web agent 841 and one of the agents ATSD.

FIG. 5 illustrates an exemplary architecture for which the translating agents are of the "ATSD" type. They are referenced $ATS_1$ through $ATS_n$, and associated with the applications $A_1$ through $A_n$. The selected application being assumed to be the application $A_i$, the session is established between the web agent 841 and the agent $ATS_i$.

A script translating agent generates a set of APDU commands. A session is opened between the translating agent, for example the agent $ATS_i$, and the APDU agent 850a. The orders are then sent to the APDU agent 850a. The APDU command handler 85a selects the "CGI" application $A_i$ and transmits to it the APDU commands, commands which are translated and therefore conventional, and which it is capable of understanding.

The responses from the application $A_i$ are transmitted to the APDU command handler 85a, to the APDU agent 850a, then again to the agent $ATS_i$ (and more generally to the script translating agent).

The various routings are represented symbolically in FIG. 5 by solid lines connecting the functional blocks, or by dotted lines inside these blocks.

To illustrate the concepts, without in any way limiting the scope of the present invention, the addressing technique having been defined in general terms up to this point, we will now describe in detail various possible routings, which will be called cases of utilization and which will be referenced CU-n:

CU-1: communication between the merchant server 4 and the smart card 8.

To achieve this, a URL address according to (1) is used. In this case, it is not necessary to use the keyboard 62. The request, transmitted via the internet network RI, arrives in the communication node 50. The latter identifies the port associated with the smart card, i.e. the port 8080, which is the same as that of the secure enclosure 6. The communication node 50 routes the request to the communication node 60. In all cases, no matter what the URL address, the latter routes the data packets received to the smart card 80. Finally, the latter activates one of the applications of the smart card 8, for example the application $A_1$.

CU-2: communication between two applications of the smart card 8.

For example, the application $A_1$ wants to communicate with the application $A_n$. The request emanating from the application $A_1$ is routed through the HTTP server 81. In a practical way, a session is established between a pair of local intelligent agents in the smart card 8, in accordance with the schema described in connection with FIG. 4. The communication node 80 is not involved. There is no communication protocol adaptation to be performed.

CU-3: communication between a card application and the merchant application 41 in the server 4.

This case can occur especially when the smart card 8 has received a request from the merchant server 4 (case CU-1). A local application in the smart card 8, for example the application $A_1$, can be activated. A given action, initiated by the received request, is then performed in the smart card, for example a CGI-type action, by running a script or any equivalent process. This action is performed under the control of script-translating intelligent agents, as explained in connection with FIG. 5.

As a result, the application $A_1$ presents a request addressed to the server 4. After examining the IP address, the HTTP server 81 routes the request to the communication node 80. A session is established between the smart card 8 and the secure enclosure 6, more precisely between the communication nodes 60 and 80, in accordance with the schema described in connection with FIG. 4. Likewise, the communication node 60, after examining the IP address, transmits the request to the communication node 50. The latter, after examining the IP address, in turn transmits the request via the internet network RI to its final destination, i.e. to the server 4.

The process can include several passes back and forth between the smart card 8 and the server 4, during the time of one transaction. When the process is finished (at the end of the CGI for example), the response from the smart card is transmitted to the merchant server 4, particularly via the successive communication nodes 80, 60 and 50.

CU-4: communication between a "card application" and a "terminal application."

For example, the application $A_1$ wants to communicate with a print manager (not represented) of the terminal and presents a request in this direction. After examining the IP address and the port number, the HTTP server 81 routes the request to the communication node 80. The request then follows the same path as in case CU-3, until it reaches the communication node 50. The latter, after examining the IP address and the port number, routes the request to the terminal application addressed, for example the print manager.

CU-5: communication between a "card application" and a resource of the secure enclosure.

It is assumed, first of all, in this case of utilization, that the smart card 8 is in "slave" mode relative to the merchant server 4 and that the latter has sent a request addressed to the smart card 8. This request is processed in the manner explained in cases CU-1 and CU-3. For example, a "merchant CGI" is executed in the smart card 8, in the manner described in connection with FIG. 5. This script is executed by activating one of the applications, for example $A_i$, with the help of one of the script translating agents, for example $ATS_i$. It is assumed that the merchant CGI needs information entered on the keyboard 62 (a password for example) or other authentication information (from a biometric device constituting one of the resources 63). The CGI in question must be executed with a particular URL address. The application $A_i$ sends a request whose address is, for example, the one given by (2) above. The presence of the suffix "/kb" tells the communication node 60 that it is necessary to loop the request back to the HTTP server 61, which in turn activates the driver 620 of the keyboard 62, and retrieves the awaited information (the entry of a password for example). The response to the request is transmitted, via the same path but in the opposite direction, to the smart card 8.

The response to the request from the merchant server 4 is then transmitted back to the latter. A back-and-forth dialogue can be established in a manner similar to case CU-3.

Several CGIs can be executed during the time of one transaction.

To illustrate the concepts, a first "merchant CGI" can result in the display, on a screen included in the secure enclosure 6 (one of the resources represented under the single reference 63), of a message prompting a user to compose a code and displaying an amount. A second CGI reads, for example, information transmitted by the keyboard 62. A third CGI can result, in this same display device, in a message of the "CODE CORRECT" type or any similar message.

CU-6: communication between the terminal and one of the resources of the secure enclosure.

For example, an application of the terminal 5 (in its non-secure part), for example the web browser 51, wants to communicate with one of the protected resources, for example with the keyboard 62, and sends a request in this direction. The communication node 50 examines the URL address, identifies the port number of the secure enclosure 6 and transmits the request to it. The communication node 60, as a result of its programming, systematically routes the requests received, even if they are addressed to one of the resources inside the secure enclosure 6, to the smart card 8. A this stage, the request follows a path similar to case CU-1. It is the smart card 8 that determines whether there is a need to retransmit the request to the secure resource initially addressed, and possibly to modify it. The decision can result from an identification procedure involving the examination of security data stored in the smart card, particularly in a read-only memory, possibly in encrypted form. As in case CU-4, an element outside the secure enclosure 6 never has direct access to the protected resources.

This last characteristic allows updates of software resident in the secure enclosure 6, additions or at least partial deletions of this software, in a way that is more reliable than in the prior art. In fact, it is customary to authenticate modifications of this nature from a key embedded in the software of the secure enclosure 6.

Since only the smart card 8 can access the protected resources of the secure enclosure 6 from the outside, the downloading of software resources can therefore be done from an Internet server, by means of the smart card, while retaining a high degree of security. The downloaded data, if they are sensitive, need only be suitably encrypted, using a robust algorithm and/or a long enough encryption key. As a result of the intermediary function played by the smart card 8, the mechanism implemented in the invention is a priori stronger than a simple embedding of a key in a storage device (not represented) of the secure enclosure 6.

It is also possible to modify the contents of the software resources of the secure enclosure 6 directly from a smart card 8, by downloading pieces of software stored in the latter. The volume of software thus downloaded is nevertheless limited by the resources specific to the smart card (storage capacity), which is not a priori the case with a download via an internet network from a web server, which server can be equipped with substantial computing resources. The download time is naturally dependent on the quantity of software to be downloaded, but the use of fast modems and/or high-speed communication lines tends to keep this time within limits that are entirely reasonable for the applications envisaged.

With the reading of the above, it is easy to see that the invention clearly achieves the objects set forth.

While maintaining the possibility of using conventional components and standardized communication modes, particularly between the secure enclosure and the smart card, via the reader, it specifically allows addressing and communications that are compatible with the HTTP internet protocol. It transforms the smart card into a web client-server, capable of performing operations of the CGI type. It specifically allows a direct and interactive addressing of the smart card from a web server via the internet network, or in the opposite direction. It does not require any specific merchant application in the terminal itself and in the secure enclosure. It offers a great deal of flexibility and is easily adapted to various fields of application. It involves only minor modifications of the components used, which modifications can essentially be summarized as the installation of specific pieces of software, it being understood that the word "specific" does not indicate any dependency on the applications handled. In particular, the applications resident in the smart card are standard applications and do not require any rewriting. Moreover, the specific applications, from a "merchant application" point of view, are located entirely in the remote web server. The latter can contain a plurality of them. Because of this, it is easy to update and delete these applications, as well to add new applications. This characteristic offers great flexibility. The version of the programs is identical for all of the terminals that connect to the server. Finally, the security provided by the invention is very high. It is possible to use robust encryption algorithms and very long keys for communications through the internet network. Furthermore, according to one characteristic of the invention, all the requests originating from outside the secure enclosure, whether from the non-secure part of the terminal or directly from the Internet, must necessarily pass through the smart card and remain under its exclusive control. The latter alone decides, for example based on resident security data, what use should be made of these requests. And the smart card remains the property of the holder.

It should be clear, however, that the invention is not limited to just the exemplary embodiments explicitly described, particularly in relation to FIGS. 3 through 5.

In one embodiment (not represented), the secure enclosure could contain only a smart card reader, the application(s) stored in the smart card being self-sufficient in authenticating the holder and/or allowing a transaction between the remote web server and the smart card. The keyboard could be omitted and replaced by one of the protected resources, such as a biometric device. Finally, it is possible to add, to the first smart card reader, a second smart card reader, or several.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. An assembly comprising:

a smart card and a terminal designed to communicate with at least one web server via an internet network, the terminal having a main part and a peripheral part, the peripheral part residing in a tamper-resistant enclosure and including a smart card reader for receiving the smart card, the main part of the terminal comprising:

a first module for enabling the terminal to communicate with the web server by establishing a communication between said first module and the web server in accordance with an internet communication protocol via two stacks of open-systems-interconnection layers specific to the internet communication protocol, one of said two stacks residing in said first module and the other stack residing in the web server;

the peripheral part of the terminal further comprising:

a second module connected to the first module for establishing a communication between the peripheral part and the main part in accordance with a peripheral-device-communication protocol via two stacks of open-systems-interconnection layers specific to the peripheral-device-communication protocol, one of said two stacks residing in the second module and the other stack residing in said first module;

the smart card comprising:

a smart card communication module for establishing communication between the smart card and the peripheral part in accordance with a smart card communication protocol via two stacks of open-system-interconnection layers specific to the smart-card-communication protocol, one of said two stacks residing in the smart card communication module and the other stack residing in said second module, said smart card further comprising a card HTTP server connected via the smart card communication module to the second module; and wherein each of said two stacks of open-systems-interconnection layers specific to the peripheral-device-communication protocol and each of said two stacks of open-systems-interconnection layers specific to the smart card communication protocol are provided with a software element called an intelligent agent having protocol conversion functions so that an internet communication between an application residing on the smart card activated through said card HTTP server, and an application residing on the web server is established via the respective stacks of open-systems-interconnection layers provided with the respective intelligent-agents, a first intelligent agent being provided in said peripheral part and using an interface connected to the smart card reader so as to communicate with a second intelligent agent provided in said smart card, said first and second intelligent agents enabling a bilateral data exchange session between said second module and smart card communication module.

2. The assembly of claim 1, wherein said main part comprises a web browser, said internet communication protocol for communication between the main part and the web server including the HTTP/TCP-IP protocol with URL addressing, comprising an IP internet address element and a port number for the selection of said terminal and of an internal element of said terminal.

3. The assembly of claim 1, wherein said peripheral part also comprises at least one data entry keyboard and at least one enclosure HTTP server disposed between said keyboard and said second module.

4. The assembly of claim 3, wherein said peripheral part comprises at least one additional computing resource connected to said HTTP server.

5. The assembly of claim 4, wherein said additional computing resource is a biometric authentication device.

6. The assembly of claim 3, wherein said smart card includes means for storing several software applications and also comprises a card HTTP server disposed between said storing means and said smart card communication module, said card HTTP server being adapted for selectively activating at least one of said software applications upon reception of a request coming from said second module and transmitting requests sent by said applications to said smart card communication module.

7. The assembly of claim 6, wherein said smart card also comprises a software entity capable of interpreting an instruction set conveyed by said data received from said smart card communication module, and of translating the instruction set into a set of commands, said translated commands set being associated with one of said software applications to be activated in said smart card.

8. The assembly of claim 6, wherein said web server stores a merchant software application designed to be placed in interactive communication with at least one of said software applications of said smart card via said first, second and smart card communication modules.

* * * * *